US012717280B2

(12) United States Patent
Imboden et al.

(10) Patent No.: US 12,717,280 B2
(45) Date of Patent: Aug. 25, 2026

(54) DIAL AND METHOD FOR MANUFACTURING A WATCH DIAL

(71) Applicant: The Swatch Group Research and Development Ltd, Marin (CH)

(72) Inventors: Matthias Imboden, St-Blaise (CH); Alain Jornod, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 548 days.

(21) Appl. No.: 18/176,343

(22) Filed: Feb. 28, 2023

(65) Prior Publication Data

US 2023/0315022 A1 Oct. 5, 2023

Related U.S. Application Data

(62) Division of application No. 16/926,847, filed on Jul. 13, 2020, now Pat. No. 11,768,470.

(30) Foreign Application Priority Data

Sep. 9, 2019 (EP) .................................... 19196181

(51) Int. Cl.
*G04C 10/02* (2006.01)
*G04B 19/06* (2006.01)

(52) U.S. Cl.
CPC ............. *G04C 10/02* (2013.01); *G04B 19/06* (2013.01)

(58) Field of Classification Search
CPC ........ G04B 19/06; G04B 19/12; G04C 10/00; G04C 10/02; G04G 17/02
See application file for complete search history.

(56) References Cited

U.S. PATENT DOCUMENTS 6,521,822 B2 * 2/2003 Ito ........................... H10F 19/37 368/80
6,791,905 B1 * 9/2004 Sekiguchi .............. G04C 10/02 368/80
8,500,268 B2 * 8/2013 Hill ........................ B41J 2/2117 347/101
2009/0129210 A1 5/2009 Yamaguchi et al.
2012/0134243 A1 5/2012 Sonoda

FOREIGN PATENT DOCUMENTS

CH 714224 A1 * 4/2019 .......... B41M 5/0047
CN 102129215 A 7/2011
JP 11-142534 A 5/1999
JP 2007-149666 A 6/2007
(Continued)

OTHER PUBLICATIONS

"Close-up of the clock face of Big Be, London" by Shutterstock.com, uploaded Jan. 9, 2017, https://www.shutterstock.com/image-photo/close-clock-face-big-ben-london-553047781?dd_referrer=https%3A%2F%2Fwww.google.com%2F.*
(Continued)

*Primary Examiner* — Justin N Olamit
(74) *Attorney, Agent, or Firm* — Oblon, McClelland, Maier & Neustadt, L.L.P.

(57) ABSTRACT

A dial for a watch includes a semi-transparent photovoltaic layer having a lower face. The dial also includes an ink-based decorative layer printed on the lower face of the photovoltaic layer. The decorative layer includes a pattern including one or more time markers.

13 Claims, 4 Drawing Sheets

(56) References Cited

FOREIGN PATENT DOCUMENTS

| | | | |
|---|---|---|---|
| JP | 2007221270 A | * | 8/2007 |
| JP | 2017-117851 A | | 6/2017 |

OTHER PUBLICATIONS

Notice of the Reason for Refusal issued Jul. 27, 2021 in Japanese Patent Application No. 2020-127965 (with English language translation), 8 pages.

European Search Report issued Mar. 31, 2020 in European Application 19196181.2 filed Sep. 9, 2019 (with English Translation of Categories of Cited Documents), 4 pages.

Combined Chinese Office Action and Search Report issued Feb. 9, 2022 in Patent Application No. 202010933706.9 (with English language translation and English translation of Category of Cited Documents), 14 pages.

* cited by examiner

DIAL AND METHOD FOR MANUFACTURING A WATCH DIAL

CROSS-REFERENCE TO RELATED APPLICATION

This application is a divisional of and claims priority to U.S. patent application Ser. No. 16/926,847, filed on Jul. 13, 2020, which claims priority to European Patent Application No. 19196181.2 filed on Sep. 9, 2019, the entire disclosure of each of which is hereby incorporated herein by reference.

FIELD OF THE INVENTION

Generally, the invention concerns watch dials, more particularly watch dials comprising a photovoltaic layer.

BACKGROUND OF THE INVENTION

Japanese Patent document JP 2005346934 aims to provide a dye-sensitized solar cell. The document proposes a dye-sensitized solar cell 11 equipped with an upper glass plate g1 and a lower glass plate g2 facing the upper glass plate. A first dye-sensitized layer 111 is arranged in a first region E1 between the upper glass plate and the lower glass plate. A second dye-sensitized layer 112 is arranged in a second region E2 different from first region E1. Regions E1 and E2 are situated between the upper glass plate and the lower glass plate. Second layer 112 has a different colour from that of first layer 111.

Japanese Patent document JP 2005324517 aims to provide a decorative device. The decorative device is equipped with a dye-sensitized solar cell arranged in a region between a pair of light-transmitting substrates (for example an upper glass plate (g1) and a lower glass plate (g2)). At least one of the pair of light-emitting substrates is provided with a decorative portion 13.

The scientific publication by L. Wen et. al, «*Theoretical design of multi-colored semi-transparent organic solar cells with both efficient color filtering and light harvesting*» Sci. Rep. 4 (2014) describes a solar cell incorporating multi-colouring capability offering an aesthetic solution and opening up the possibility for self-powered colourful display.

General Description of the Invention

A dial is the part of a watch that displays the time by means of one or more time markers (e.g. indication of a number (12 or XII, 60, . . . )) and moving hands. In its most basic form, the periphery of the dial is numbered from 1 to 12 and indicates the hours in a 12-hour cycle. A first hand makes one revolution every 12 hours. A second hand, longer than the first hand, makes one revolution per hour. One or more holes are provided in the dial for the passage of one or more arbors of one or more hands.

A first aspect of the invention concerns a dial for a watch. The dial has a semi-transparent photovoltaic layer having a lower face. Furthermore, the dial also comprises an ink-based decorative layer printed on the lower face of the photovoltaic layer. The decorative layer includes a pattern comprising one or more time markers.

A 'photovoltaic layer' means a layer which, when exposed to light, produces electricity by means of the photovoltaic effect.

A 'semi-transparent' layer means a layer comprising one or more transparent areas and one or more opaque areas, the layer being, in terms of surface, predominantly transparent.

Preferably, the surface of one or more transparent areas is greater than 80%, preferably within a range of between 80% and 95%, of the surface of the layer.

Generally, the 'upper', 'top' or 'uppermost' face, surface or side of an object means the face, surface or side of the object closest to the watch user. It is also the face, surface or side of the object that receives the incident light. Conversely, the 'lower', 'bottom' or 'under' face, surface or side of an object means the face, surface or side of the object farthest from the watch user's view (i.e. the face, surface or side opposite the upper face, surface or side).

'Ink' means a liquid (or possibly a paste) containing one or more pigments or one or more dyes and used to dye a surface in order to produce e.g. an image, text, or drawing.

'Time marker' means any element making it possible to deduce the time by means of one or more of the watch hands (e.g. indication of a number (12 or XII, 60, . . . ) at the periphery of the dial).

It will be appreciated that the present invention makes it possible to reduce the number of parts required to assemble the dial because the decorative layer is printed on the photovoltaic layer (the decorative layer and the photovoltaic layer are integral and do not need to be joined in-situ during the assembly of the watch).

The pattern preferably comprises a first area including a first ink and a second area including a second ink. The first ink and the second ink are different. Preferably, the first area is central, and the second area is peripheral. A 'different' ink means an ink having a different chemical composition from another ink. The decorative layer can be opaque or semi-transparent. It may be plain or comprise several patterns with or without symmetry. It will be appreciated that great freedom is allowed with respect to decorative patterns.

According to one embodiment, the semi-transparent photovoltaic layer includes an arrangement of one or more photovoltaic cells covering between 5% and 20%, preferably between 7% and 15%, even more preferably between 9% and 11% of the photovoltaic cell surface. It will be appreciated that, in this way, most of the incident light illuminates the decorative layer.

According to one embodiment, the one or more photovoltaic cells are arranged in an array, the array preferably being a hexagonal, linear, or triangular array. According to another embodiment, the array is a mixed array comprising at least two of the following arrays: a hexagonal array, a linear array, and a triangular array. According to another embodiment, the array could be irregular.

Preferably, the photovoltaic cell includes a protective sublayer (possibly transparent or semi-transparent), the protective sublayer being the bottom layer of the photovoltaic cell and being in contact with the decorative layer.

According to a preferred embodiment, the dial comprises a shiny transparent layer arranged between the semi-transparent photovoltaic layer and the decorative layer.

According to a preferred embodiment, the photovoltaic layer comprises an active material having a different sensitivity according to the wavelength of the incident light. The decorative layer is configured to reflect the incident light at a wavelength substantially equal to maximum sensitivity of the active material. Preferably, the decorative layer is configured to reflect the incident light at a wavelength within a range of between −150 nm to 150 nm, more preferably within a range of between −100 nm to 100 nm, still more preferably in a range of between −50 nm to 50 nm centred on maximum sensitivity of the active material.

The 'sensitivity' of an active photovoltaic material to a wavelength means the capacity of this material to absorb an incident wave at this wavelength and to transform it, by the photovoltaic effect, into electrical energy.

A second aspect of the invention concerns a method for manufacturing a dial for a watch. The method includes providing a semi-transparent photovoltaic layer having a lower face. The method further includes applying an ink-based decorative layer to the lower face of the photovoltaic layer. The decorative layer includes a pattern comprising one or more time markers.

According to one embodiment, the decorative layer is applied by printing.

According to one embodiment, the decorative layer is applied by digital printing. The pattern can be applied in accordance with an application plan stored in a digital printer performing digital printing.

Preferably, printing is performed by a UV flatbed printer.

According to one embodiment, the method includes applying a shiny transparent layer, the top finish layer being applied between the semi-transparent photovoltaic layer and the decorative layer.

A third aspect of the invention concerns a watch including the dial according to the first aspect.

BRIEF DESCRIPTION OF THE DRAWINGS

Other peculiarities and features of the invention will appear from the detailed description of certain advantageous embodiments presented below, by way of illustration, with reference to the annexed drawings which show.

The reader's attention is drawn to the fact that the drawings are not to scale. Further, for reasons of clarity, the proportions of height, length and/or width may not be correctly represented.

DETAILED DESCRIPTION OF A PREFERRED EMBODIMENT OF THE INVENTION

Figure 1:
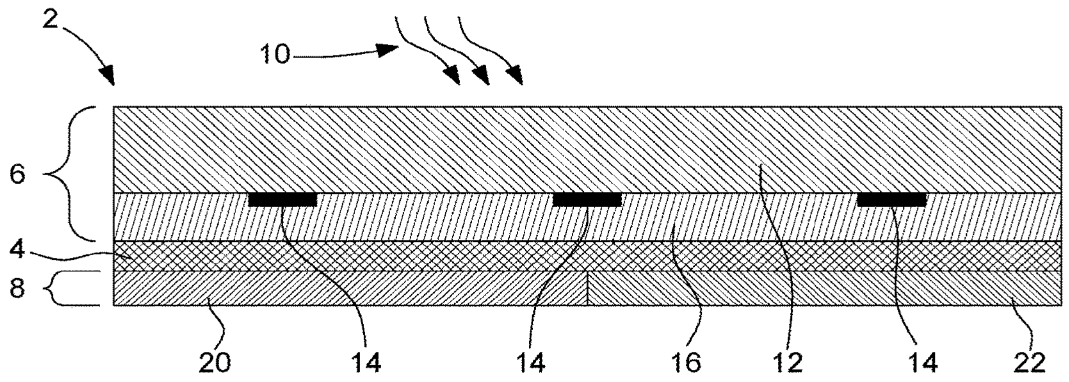
FIG. 1: a cross-section of a watch dial according to a preferred embodiment of the invention.

FIG. 1 shows a cross-section of a watch dial 2 according to a preferred embodiment of the invention. Dial 2 comprises, from the top to the bottom of the dial, a semi-transparent photovoltaic layer 6, a shiny transparent layer 4 and a decorative layer 8. The 'top' of the dial means the part closest to the watch user's view. The uppermost layer is also the layer through which incident light 10 first passes.

Figure 2:
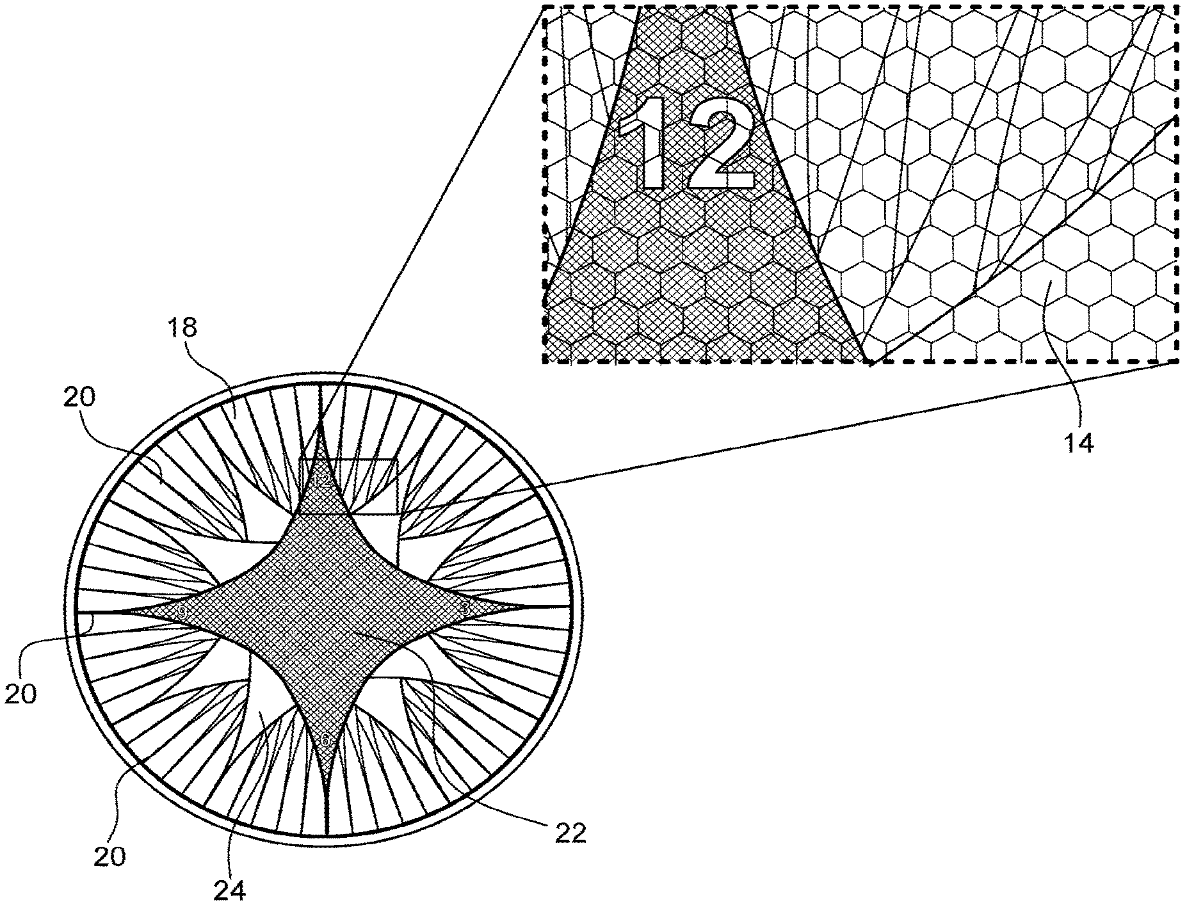
FIG. 2: a view of a watch dial showing a decorative pattern and an array of a photovoltaic cell with one or more segments according to an embodiment of the invention, with a hole for the hand arbors visible at the centre of the dial.

With reference to FIGS. 1 and 2, semi-transparent photovoltaic layer 6 includes a transparent glass sublayer 12, one or more photovoltaic cells 14 arranged in a hexagonal array and a protective sublayer 16. Protective sublayer 16 structurally stabilizes the hexagonal array of photovoltaic cells 14 and protects it against any shocks. Protective sublayer 16 is in direct contact with shiny transparent layer 4, in particular, the lower face of protective sublayer 16 is in direct contact with the upper layer of shiny transparent layer 4.

The active material used for one or more photovoltaic cells is based on amorphous silicon. It will, however, be appreciated that, according to other embodiments, the active material can be different.

It will also be appreciated that, according to other embodiments, transparent glass sublayer 12 can be replaced with a sublayer of another transparent (possibly partially transparent) material, such as, for example, sapphire or plastic.

Preferably, the hexagonal array of photovoltaic cells 14 covers between 5% and 20%, preferably between 7% and 15%, still more preferably between 9% and 11% of the photovoltaic cell surface. It will be appreciated that, in this manner, most of incident light 10 illuminates decorative layer 8.

Decorative layer 8 is applied to semi-transparent photovoltaic layer 6 by digital printing. Decorative layer 8 includes a pattern 18 comprising several time markers 20. Decorative layer 8 can be coloured, for example, black, white, yellow, violet, etc. and possibly comprise transparent areas. It will be appreciated that digital printing provides great flexibility as regards the printed patterns. Printing can be performed by a UV flatbed printer. The pattern can be applied in accordance with an application plan stored in a digital printer performing digital printing.

It will be appreciated that the pattern can comprise a plurality of areas including different inks. In particular, according to a preferred embodiment, decorative layer 8 can include a first area 22 including a first ink and a second area 24 including a second ink. The first ink and the second ink are different in the sense that, for example, they have a different chemical composition and/or a different colour. Time markers 20 can, for example, be indicated by second area 24.

Transparent layer 4 is placed between semi-transparent photovoltaic layer 6 and decorative layer 8. Transparent layer 4 can improve the interface between the ink of the decorative layer and photovoltaic layer 6, e.g. in case of physical and/or chemical incompatibility between the ink of decorative layer 8 and photovoltaic layer 6.

A first example of a pattern is illustrated in FIG. 2. Decorative layer 8 includes a first central black area 22. First area 22 has four time markers each indicated by a tip associated with the numbers '12', '3', '6' and '9' indicated in white. First area 22 is surrounded by a violet peripheral area 24. The pattern of peripheral area 24 also includes time markers in the form of a rosace the tips of which are separated from each other by one 60th of a revolution.

Figure 3:
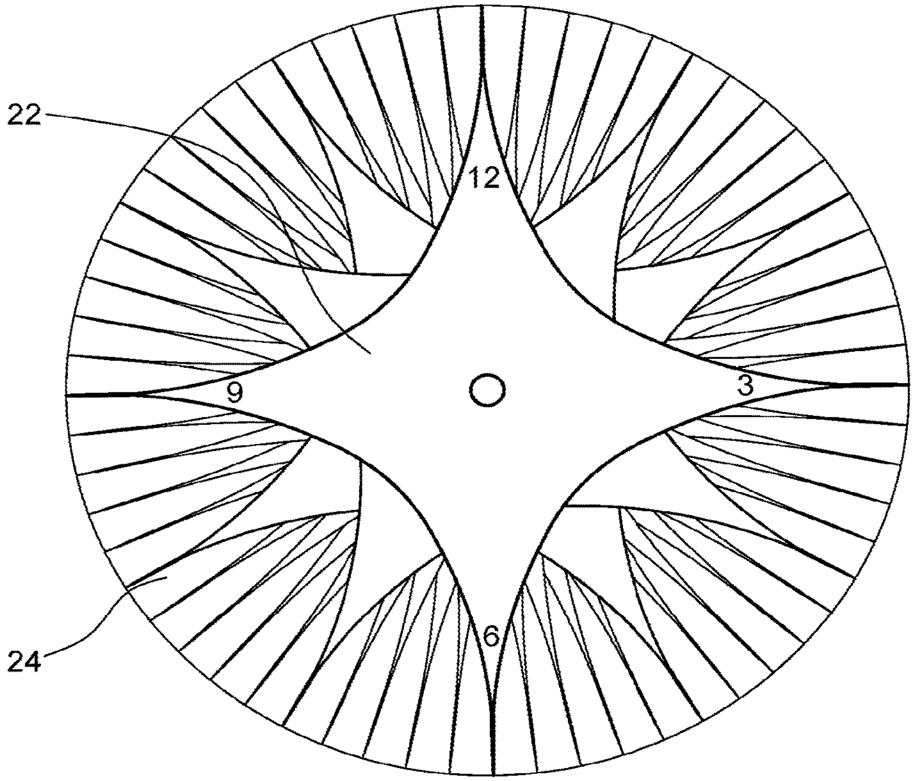
FIG. 3: a view of a watch dial showing another decorative pattern according to an embodiment of the invention.

A second example of a pattern is illustrated in FIG. 3. The second example is identical to the first with the exception of the choice of colours. In particular, the first central area 22 is semi-transparent (the numbers being black) and ink-free, and the second peripheral area 24 is yellow.

EXAMPLES

The semi-transparent photovoltaic layer includes an array of one or more photovoltaic cells covering 10% of the surface of the photovoltaic layer. The decorative layer is printed by a UV flatbed printer.

Figure 4:
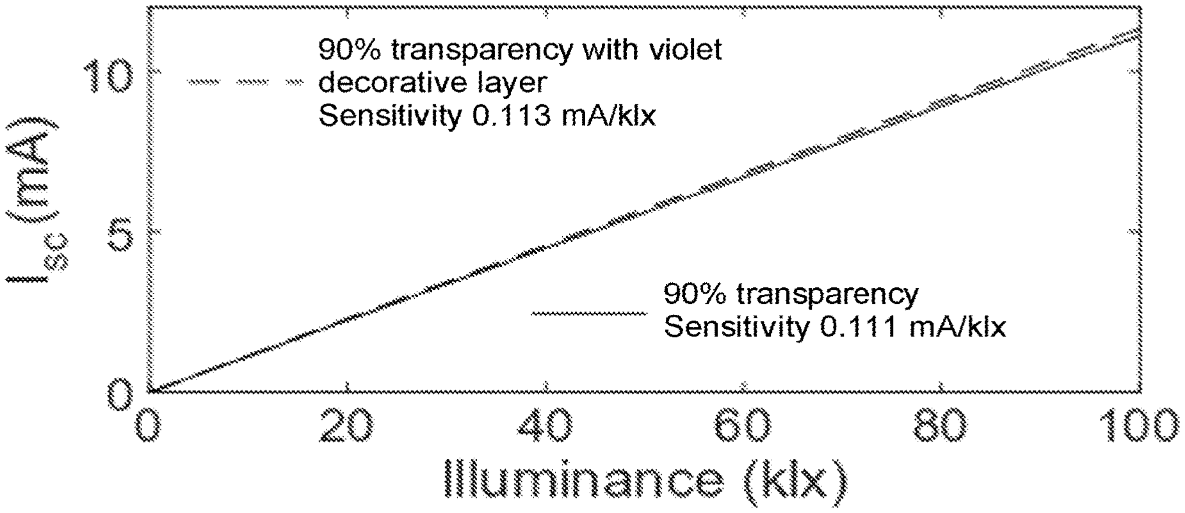
FIG. 4: a graph representing the intensity at zero voltage of a first sample according to an embodiment of the invention as a function of the illuminance received by the sample, according to an embodiment of the invention.
Figure 5:
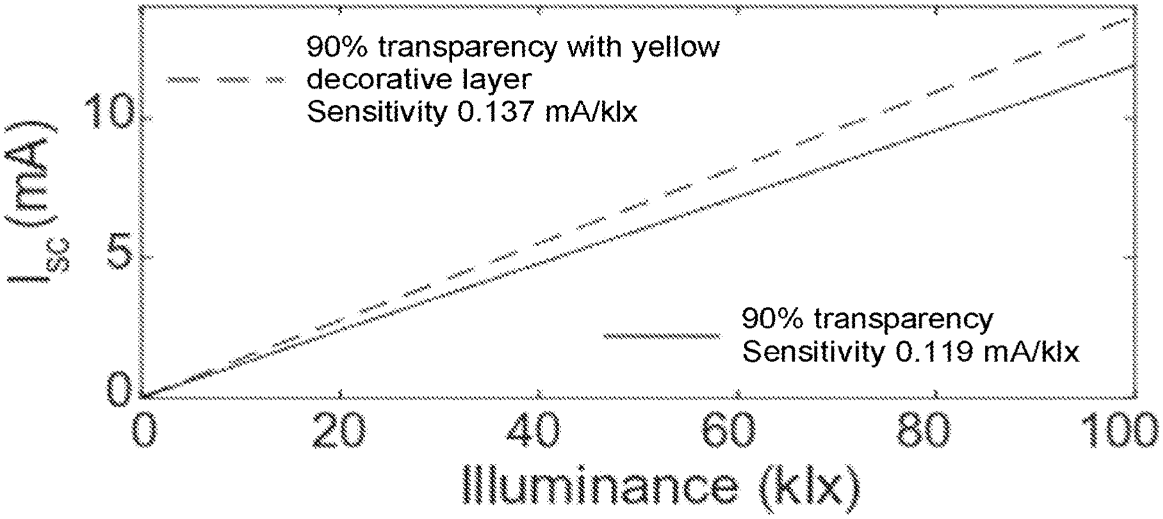
FIG. 5: a graph representing the intensity at zero voltage of a second sample according to an embodiment of the invention as a function of the illuminance received by the sample, according to an embodiment of the invention.

The intensity at zero voltage Isc is proportional to the illuminance received by the sample. The graphs illustrated in FIGS. 4 and 5 represent typical results from the intensity at zero voltage Isc as a function of illuminance. FIG. 4 corresponds to the comparison between a sample with (dotted line) or without (solid line) a black and violet decorative layer comprising a hexagonal array of photovoltaic cells covering 10% of the surface of the photovoltaic layer. The slopes obtained are respectively 0.113 mA/klx and 0.111 mA/klx. FIG. 5 corresponds to the comparison between a sample with (dotted line) or without (solid line) a yellow decorative layer comprising a hexagonal array of photovoltaic cells covering 10% of the surface of the photovoltaic layer. The slopes obtained are respectively 0.137 mA/klx and 0.119 mA/klx.

It appears that intensity at zero voltage Isc is only slightly affected by the application of a violet decorative layer, it is even increased by around 2%. In the case of application of a yellow decorative layer, intensity at zero voltage Isc has increased by 15%.

If follows that, depending on the colours chosen for the decorative layer, photovoltaic efficiency can be improved. The improvement is due to the light backscattered at the crystal/printed layer interface and undergoing multiple reflections inside the glass sublayer. The light thus reflected improves efficiency since an additional portion of the incident light reaches the one or more photovoltaic cells. In the absence of a decorative layer, this additional portion is lost since it is not reflected and consequently does not reach the one or more photovoltaic cells.

Figure 6:
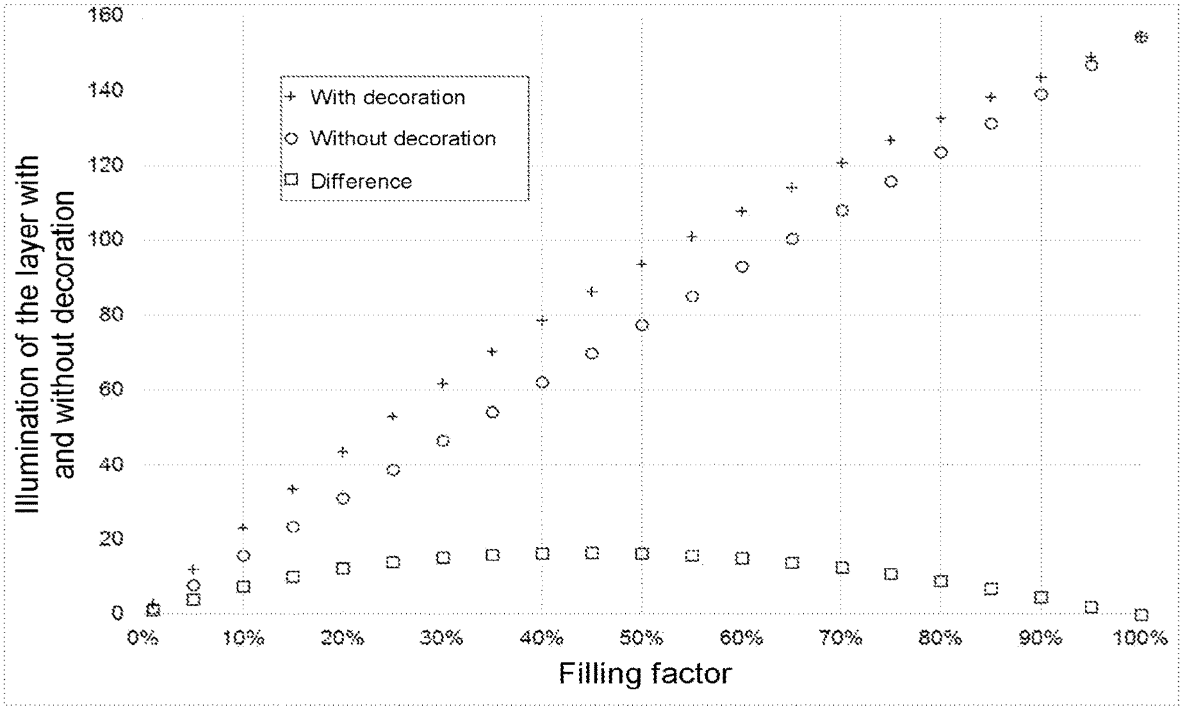
FIG. 6: a (ray tracing) simulation showing the increased illumination of the photovoltaic cell by backscattering of the light at the crystal/printed decorative layer interface.

FIG. 6 shows the results of a simulation (ray tracing simulation) for a sample without a decorative layer (circles) and with a white decorative layer (cross). Incident light 10 is characterized by a solar spectrum. The white decorative layer is modelled by a Lambertian surface without absorption. The graph represents the illumination of photovoltaic layer 14 as a function of the surface filling factor of between 1% and 100%. The difference between the two samples is represented by squares.

Figure 7:
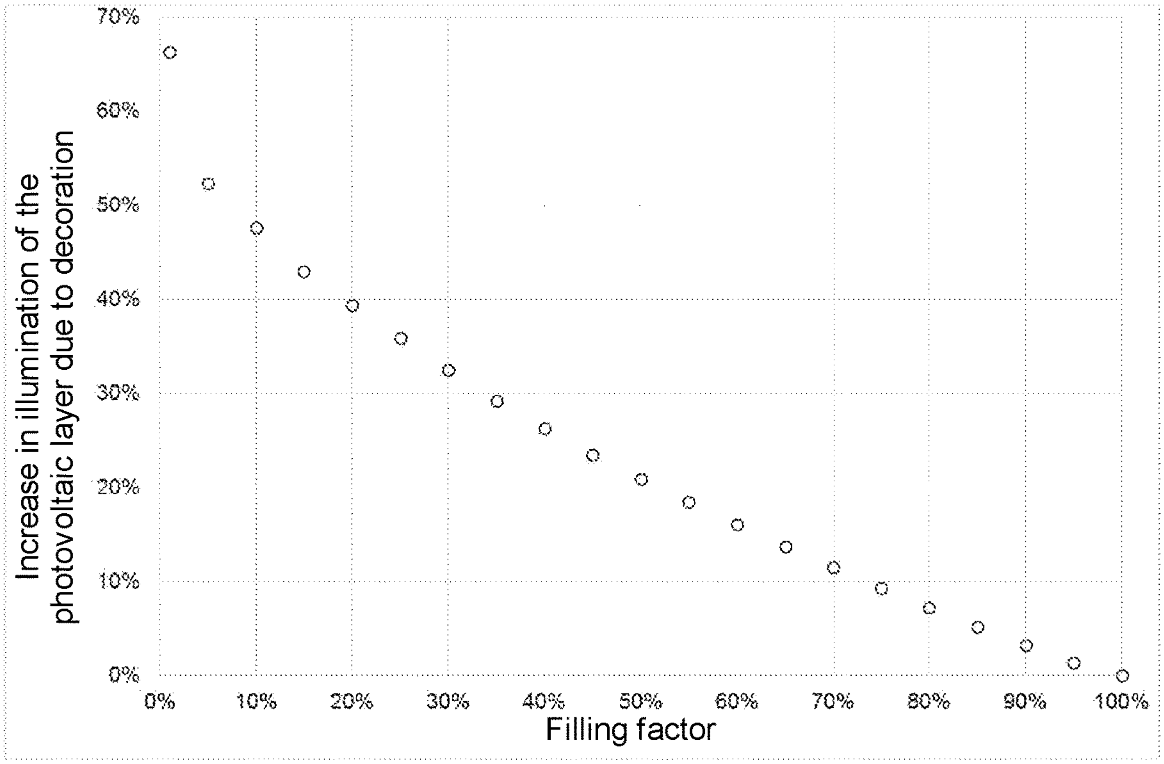
FIG. 7: a graph representing the relative increase in illumination of the photovoltaic layer as a function of the surface filling factor.

FIG. 7 represents the relative increase in incident light on photovoltaic layer 14 as a function of the surface filling factor of between 1% and 100%. This curve represents the maximum increase in illumination on the photovoltaic layers due to the backscattered light at the glass/printed layer interface and undergoing multiple reflections inside the glass sublayer since in these simulations, zero absorption from decorative layer 8 and glass sublayer 12 was considered.

Figure 8:
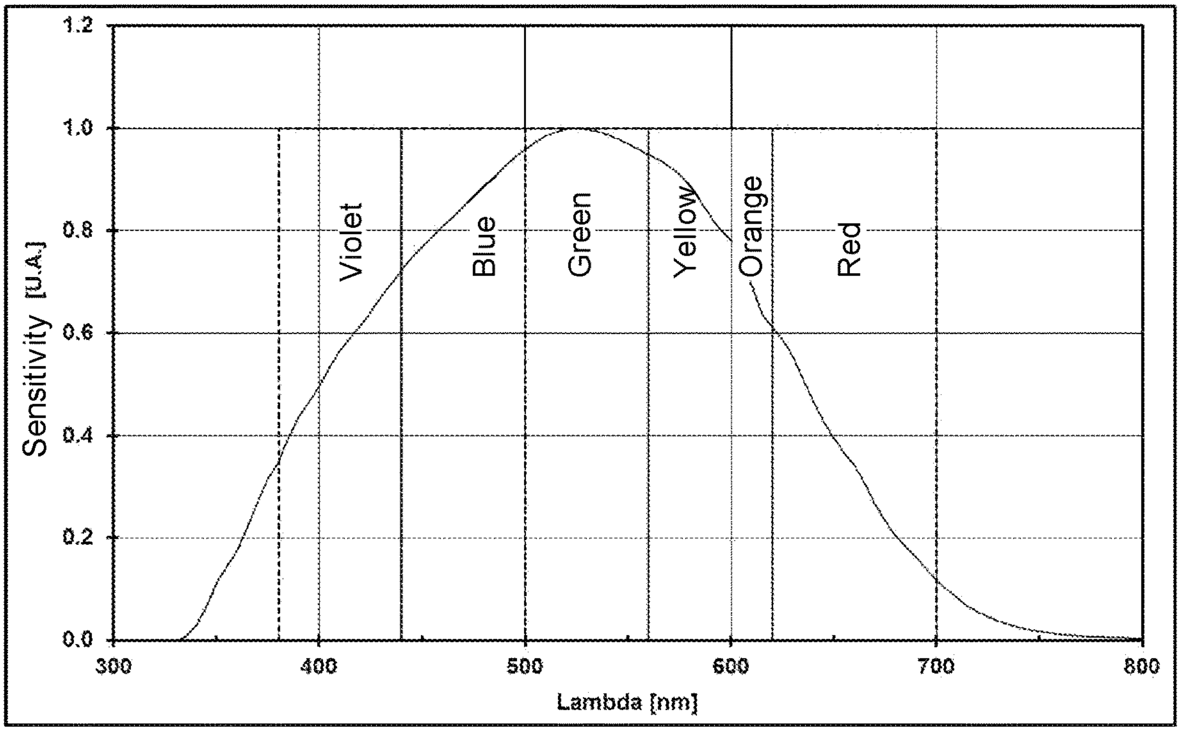
FIG. 8: a graph representing the sensitivity of the active material as a function of the incident light wavelength used in a dial according to a preferred embodiment of the invention.

FIG. 8 represents the sensitivity curve of the active material (amorphous silicon) as a function of the incident light wavelength. In the same Figure, the visible colours are also represented as a function of wavelength. According to the curve, the maximum sensitivity (1 in arbitrary units) of the active material is around 525 nm (green). The sensitivity of the material to the colour yellow is around 0.9 (i.e. 90% of the maximum sensitivity of the active material). The sensitivity of the material to the colour violet is around 0.55 (i.e. 55% of the maximum sensitivity of the active material). It therefore follows that it is more beneficial to reflect generally yellow light (i.e. to have a generally yellow decorative layer) than to reflect generally violet light (i.e. to have a generally violet decorative layer) in the case of amorphous silicon.

Moreover, it follows that efficiency can be increased by increasing the proportion of white surface (reflection of substantially all the colours making up incident light) with respect to the total surface of the decorative layer or by increasing the proportion of colours whose wavelength is close to the maximum spectral sensitivity of the active material (450 to 600 nm, blue to orange in the case of amorphous silicon).

It is evident to those skilled in the art, based on the present document, that the increase in efficiency with colours could differ for other active materials.

The use of fluorescent inks, absorbing beyond the maximum sensitivity and emitting close to the maximum sensitivity of the active material, could also improve efficiency. In the example of amorphous silicon, the choice could concern an ink absorbing in the ultraviolet domain and emitting in the visible domain. Preferably, the emission of this fluorescence could occur at a wavelength within a range of between −150 nm to 150 nm centred on maximum sensitivity of the active material.

Although particular embodiments have just been described in detail, those skilled in the art will appreciate that various modifications and alternatives thereto could be developed in light of the overall teaching provided by the present disclosure of the invention. Consequently, the specific arrangements and/or methods described herein are intended to be given purely by way of illustration, with no intention of limiting the scope of the invention.

The invention claimed is:

1. A method for manufacturing a watch dial, comprising:
- providing a semi-transparent photovoltaic layer having a lower face;
- applying a shiny transparent layer to the lower face of the photovoltaic layer, the shiny transparent layer having a lower face; and
- applying an ink-based decorative layer to the lower face of the shiny transparent layer, the decorative layer including a pattern, the pattern comprising one or more time markers,
- wherein a width of the decorative layer is equal to a width of the shiny transparent layer.

2. The manufacturing method according to claim 1, wherein the decorative layer is applied by printing.

3. The manufacturing method according to claim 2, wherein the printing is performed by a UV flatbed printer.

4. The manufacturing method according to claim 1, wherein the decorative layer is applied by digital printing, wherein the pattern is applied in accordance with an application plan stored in a digital printer performing the digital printing.

5. The manufacturing method according to claim 1, wherein the decorative layer is applied by digital printing.

6. The manufacturing method according to claim 1, wherein the photovoltaic layer includes a transparent glass sublayer, one or more photovoltaic cells, and a protective sublayer.

7. The manufacturing method according to claim 6, wherein the photovoltaic cells are arranged in a hexagonal array within the protective sublayer.

8. The manufacturing method according to claim 1, wherein the decorative layer has a same width as the photovoltaic layer.

9. The manufacturing method according to claim 1, wherein the decorative layer includes a first area including a first ink and a second area including a second ink, the second ink being different from the first ink.

10. The manufacturing method according to claim 1, wherein the pattern of the decorative layer includes a central area including four time markers, each of the time markers being indicated by a tip of the central area associated with the marker, and the pattern also includes a peripheral area surrounding the central area, the peripheral area including time markers forming a rosace having tips that are separated by one sixtieth of a revolution.

11. The manufacturing method according to claim 10, wherein the central area of the pattern is black and the time markers of the central area are white, and the peripheral area is violet.

12. The manufacturing method according to claim 10, wherein the central area of the pattern is ink-free except for the time markers of the central area which are white, and the peripheral area is yellow.

13. The manufacturing method according to claim 1, wherein the watch dial is arranged on a watch such that the photovoltaic layer receives incident light before the shiny transparent layer applied to the lower face of the photovoltaic layer.

* * * * *